INVENTORS
Earl H. Rix &
Richard G. Hill.

July 13, 1954
E. H. RIX ET AL
2,683,859
RANGE INDICATOR
Filed Jan. 12, 1949
2 Sheets-Sheet 2
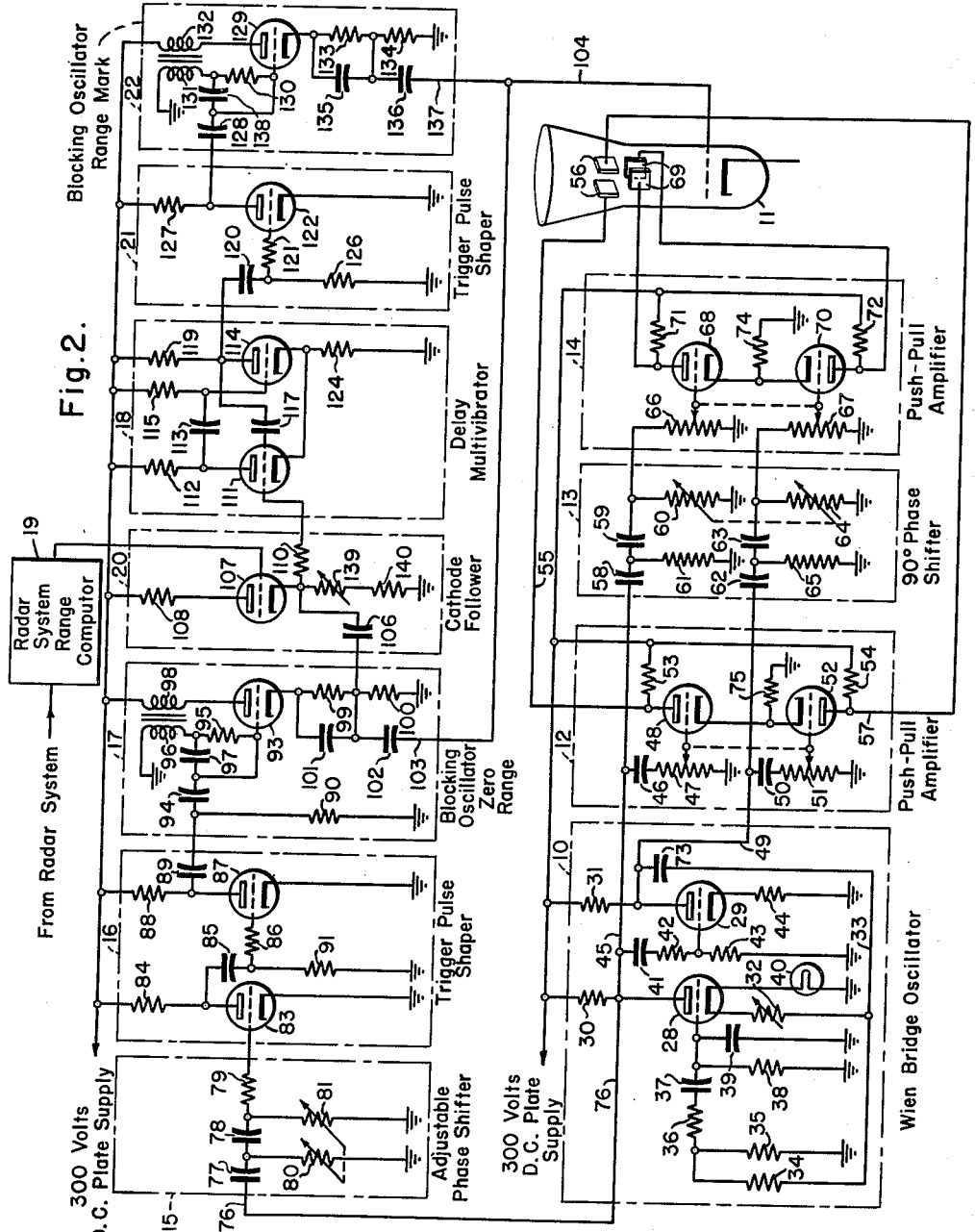
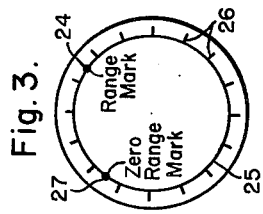
WITNESSES:
Robert G. Baird
New. C. Groome
INVENTORS
Earl H. Rix &
Richard G. Hill.
BY
F. E. Browder
ATTORNEY Patented July 13, 1954

2,683,859

UNITED STATES PATENT OFFICE 2,683,859

RANGE INDICATOR

Earl H. Rix and Richard G. Hill, Glen Burnie, Md., assignors to Westinghouse Electric Corporation, East Pittsburgh, Pa., a corporation of Pennsylvania Application January 12, 1949, Serial No. 70,428

12 Claims. (Cl. 324—68)

This invention relates to circuits for converting direct current voltages into proportional time periods, and it relates more particularly to circuits for providing visual indications on sweep patterns on the screens of cathode ray tubes, of the ranges of the targets of radar systems.

The outputs of many conventional radar systems are direct current voltages which are proportional to the ranges of their targets. It is desirable, especially for the pilot of an airplane, to be able to determine the range of a target as a visual indication on the screen of a cathode ray tube.

This invention provides a circuit for producing a sweep pattern on the screen of a cathode ray tube, and for converting the direct current voltages from a source, such as a conventional range computor of a radar system, into proportional time periods, the beginnings and ends of which establish markers on the sweep pattern.

In one embodiment of the invention, a stable oscillator establishes a circular trace on the screen of a cathode ray tube serving as a range indicator, by supplying sweep voltages to one set of deflection plates of the tube, and by supplying similar sweep voltages through a 90° phase shifter to the other deflection plates of the tube. The output of the oscillator also establishes through a phase shifter, a trigger pulse shaper and a blocking oscillator, a zero range mark by producing an intensified spot on the trace.

The range mark is produced by using the pulse from the blocking oscillator to trigger a multivibrator. The direct current output voltage from the range computor of a radar system is used to control the delay of the multivibrator which triggers through a trigger pulse shaper, a range mark blocking oscillator which produces another intensified spot on the circular trace, the distance between the two spots indicating the range of the target.

An object of the invention is to indicate an electrical voltage as a distance between spaced marks on a sweep pattern on the screen of a cathode ray tube.

Another object of the invention is to convert electrical voltages into proportional time periods, and to establish the beginnings and ends of such periods as marks on a pattern traced on the screen of a cathode ray tube.

Another object of the invention is to utilize the direct-current voltages from the output of a radar system, which are proportional to the ranges of the targets thereof, for establishing marks spaced apart distances on a sweep pattern on the screen of a cathode ray tube, which are proportional to the target ranges.

The invention will now be described with reference to the drawings, of which:

Fig. 2 is a circuit diagram illustrating the circuit components used in the block diagram of Fig. 1, and Fig. 3 is a view of the screen of the cathode ray tube used, and illustrates a range scale, a circular trace on the screen, and markers on the trace, the distances between which are indicative of the range of a target.

Figure 1:
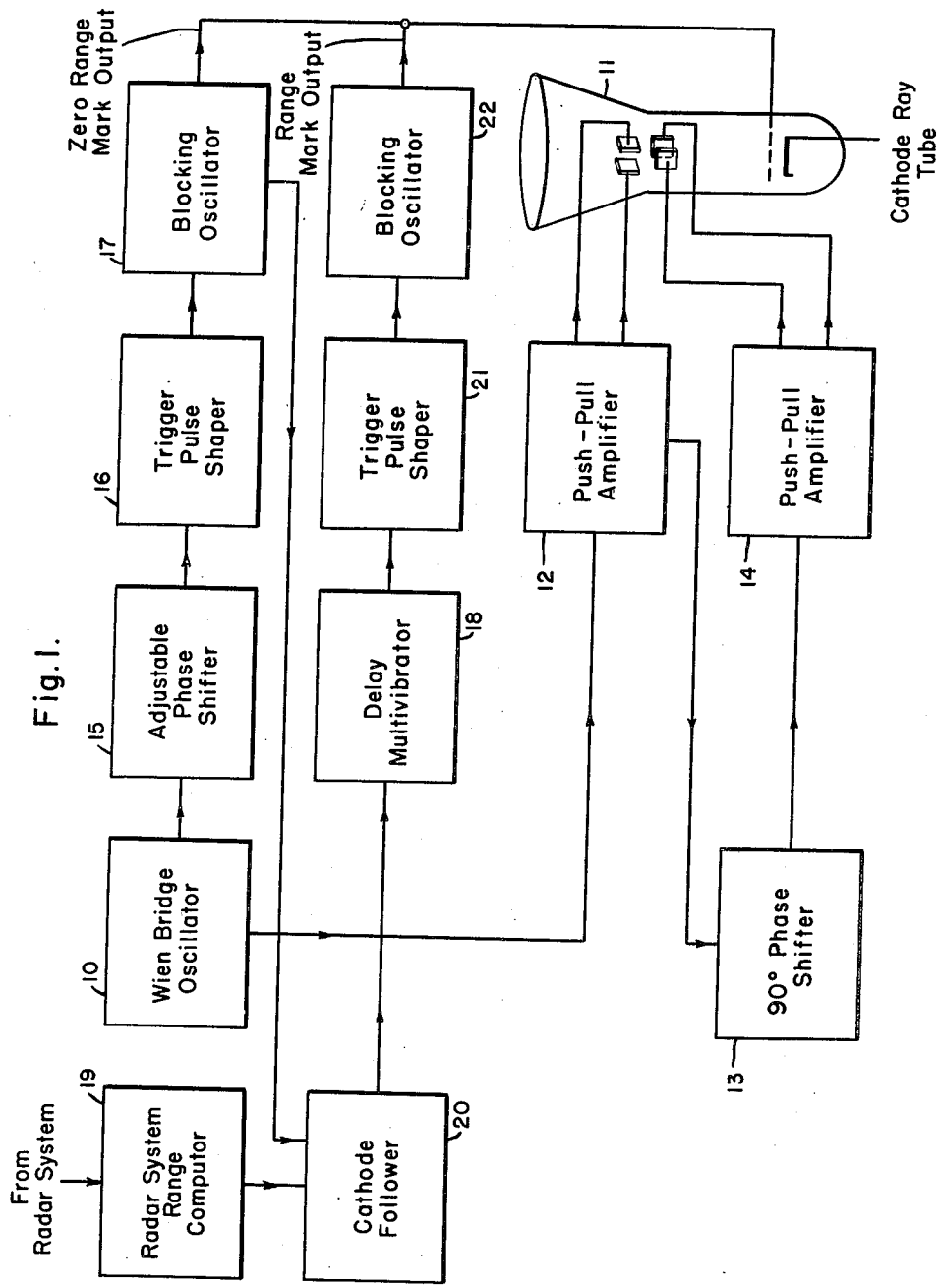
Fig. 1 is a simplified block diagram of a circuit illustrating one embodiment of the invention in which the direct-current voltages from the range computor of a radar system, are used to indicate the ranges of the targets on a circular trace on the screen of a cathode ray tube.

The circuit of Figs. 1 and 2 performs two functions: one, the production of a circular trace on the screen of the cathode ray tube 11, and the other, the production of range markers on the circular trace, the distances between which are proportional to the direct-current voltages derived from the conventional range computer 19 of a conventional radar system.

The principle of the invention may be understood with reference to the simplified, block diagram of Fig. 1. The stabilized Wien bridge oscillator 10 is used as an independent time base, it not being synchronized with any other component. It establishes a circular trace on the screen of the cathode ray tube 11 which serves as a range indicator, by supplying its output through the push-pull amplifier 12 to the horizontal sweep plates of the tube 11, and by supplying its output through the 90 degree phase shifter 13 and the push-pull amplifier 14 to the vertical sweep plates of the tube 11.

The output of the oscillator is also supplied through the adjustable phase-shifter 15 and the trigger pulse-shaper 16, to the blocking oscillator 17 which is connected to the control grid of the tube 11, and which supplies a pulse to the grid which produces an intensified spot on the circular trace on the screen of the tube 11. This spot serves as the zero range mark of the target.

The pulse from the blocking oscillator 17 also is connected to, and triggers the delay multivibrator 18. The direct current voltage of the range computer 19 of the radar system, which voltage is proportional to the range of the target, is supplied through the cathode follower 20 and is used to control the pulse width of the multivibrator 18. The output of the multivibrator is delayed by differentiating the pulse and using the spike corresponding to the trailing edge of the pulse as the delayed pulse. The delayed output of the multivibrator is supplied through the trigger pulse shaper 21 to the blocking oscillator 22, the output of which is connected to the control grid of the tube 11, and which produces an intensified spot on the circular trace on the screen of the tube. This spot serves as the range mark. The distance between the two intensified spots on the circular trace is indicative of the range of the target.

Fig. 3 illustrates the screen of the tube 11 with the circular trace 25 thereon, the trace passing through the calibrations 26 which form a range measuring scale. The spot 27 on the trace 25 is a zero range mark, and the spot 24 on the trace is a range mark, the sweep being clockwise, facing Fig. 3. The distance between the two spots can be read off the scale for determining the range of the target.

The oscillator 10 is a stabilized Wien bridge oscillator and includes the two triode vacuum tubes 28 and 29, the plates of which are connected through the resistors 30 and 31 respectively, to the positive terminal of a conventional, plate voltage supply source which is not illustrated.

The tube 28 has its cathode connected through the resistor 32, the wire 33 and the coupling condenser 73 to the plate of the tube 29 in a negative feed-back connection. The resistors 34 and 35 are connected in series between the wire 33 and ground, and their midpoint connection is connected through the resistor 36 and the condenser 37 to the grid of the tube 28, which is connected to ground through the resistor 38 across which the by-pass condenser 39 is connected. The cathode of the tube 28 is connected through the filament of the three watt incandescent lamp 40 to ground.

The plate of the tube 28 is connected through the coupling condenser 41 and the resistor 42 to the grid of the tube 29, which is connected through the resistor 43 to ground. The cathode of the tube 29 is connected through the resistor 44 to ground.

The resistor 32 is adjustable for varying the feed-back from the plate of the tube 29 to the grid of the tube 28. The resistors in the grid circuits of the tubes 28 and 29 provide divider networks which permit relatively large voltage swings at their plates without distortion, and which provide equal outputs to the vertical and horizontal deflection plates of the cathode ray tube 11 as will be described.

The resistors and capacitors in the grid circuit of the tube 28 determine the frequency of the oscillator 10, which may be 3 kilocycles. The lamp 40 in the cathode circuit of the tube 28 controls the degenerative voltage so that the oscillator frequency remains constant at 3 kilocycles, and so that the output of the oscillator remains substantially constant with changes in load and in supply voltage.

The outputs of the two oscillator tubes 28 and 29 are sinusoidal, the output at the plate of the tube 28 being 180 degrees out-of-phase with the output at the plate of the tube 29.

The plate of the tube 28 is connected through the wiring 45 to one side of the input of the push-pull amplifier 12, and is connected in the amplifier, through the coupling condenser 46, to one side of the potentiometer 47, the other side of which is grounded. The slider of the potentiometer 47 is connected to the grid of the vacuum tube 48.

The plate of the tube 29 is connected through the wiring 49 to the other side of the input of the amplifier 12, and is connected in the amplifier, through the coupling condenser 50 to one side of the potentiometer 51, the other side of which is grounded. The slider of the potentiometer 51 is connected to the grid of the vacuum tube 52.

The plates of the amplifier tubes 48 and 52 are connected through the resistors 53 and 54 respectively, to the positive terminal of the plate voltage supply source. The plate of the tube 48 is also connected through the wire 55 to one of the horizontal deflection plates 56 of the cathode ray tube 11. The plate of the tube 52 is connected by the wire 57 to the other horizontal deflection plate 56. The cathodes of the tubes 48 and 52 are connected together and through the bias resistor 75 to ground. The sliders of the potentiometers 47 and 51 are connected together for simultaneous adjustment of the gain of the two tubes 48 and 52.

The plates of the oscillator tubes 28 and 29 are also connected by the wiring 45 and 49 respectively, to the input of the 90 degree phase shifter 13, the wiring 45 being connected through the series-connected condensers 58 and 59 to one side of the variable resistor 60, the other side of which is grounded. The resistor 61 is connected to the midpoint connection of the condensers 58 and 59, and to ground.

The wiring 49 is connected through the series-connected condensers 62 and 63 to one side of the variable resistor 64, the other side of which is grounded. The resistor 65 is connected to the midpoint connection of the condensers 62 and 63, and to ground.

The sliders of the resistors 60 and 64 are connected together for simultaneous adjustment so that an exactly 90 degree phase shift can be provided.

The output of the phase-shifter 13 is connected to the input of the push-pull amplifier 14, which includes the potentiometers 66 and 67, one side of the potentiometer 66 being connected to one side of the output of the phase-shifter, with its other side grounded. One side of the potentiometer 67 is connected to the other side of the output of the phase-shifter, with its other side grounded.

The slider of the potentiometer 66 is connected to the grid of the vacuum tube 68, the plate of which is connected to one of the vertical deflection plates 69 of the cathode ray tube 11. The slider of the potentiometer 67 is connected to the grid of the vacuum tube 70, the plate of which is connected to the other vertical deflection plate 69. The plates of the tubes 68 and 70 are also connected through the resistors 71 and 72 respectively, to the plate voltage supply source. The cathodes of the tubes 68 and 70 are connected together, and through the bias resistor 74 to ground. The sliders of the potentiometers 66 and 67 are connected together for simultaneous adjustment of the gain of the tubes 68 and 70.

The voltages from the amplifier 14 to the vertical deflection plates of the cathode ray tube 11, are 90 degrees apart in phase from the equal voltages from the amplifier 12 to the horizontal deflection plates of the tube 11, so that a circular sweep trace is provided on the screen of the tube.

A single-ended output from the oscillator 10 is taken from the plate of the tube 28 and applied through the wire 76 to the input of the adjustable phase-shifter 15. The wire 76 is connected through the series-connected condensers 77 and 78 to one side of the resistor 79. The mid-point connection of the condensers 77 and 78 is connected through the variable resistor 80 to ground. The variable resistor 81 is connected to the point of connection of the condenser 78 to the resistor 79, and to ground. The sliders of the resistors 80 and 81 are connected together for simultaneous adjustment, and serve to adjust the phase of the phase-shifter 15 over a range of about 50 degrees, this adjustment determining the position of the zero range mark on the screen of the cathode ray tube 11.

The other end of the resistor 79 in the phase-shifter 15, is connected to the grid of the vacuum tube 83 in the trigger pulse shaper 16. The plate of the tube 83 is connected through the resistor 84 to the positive terminal of the plate voltage supply source, and is connected through the series-connected coupling condenser 85 and the resistor 86 to the grid of the vacuum tube 87. The plate of the tube 87 is connected through the resistor 88 to the positive terminal of the plate voltage supply source, and to one side of the coupling condenser 89. The cathode of the tube 83 is connected to ground. The midpoint connection of the condenser 85 and resistor 86 is connected through the resistor 91 to ground. The cathode of the tube 87 is connected directly to ground.

The trigger pulse shaper 16 by over amplifying the sinusoidal output of the phase-shifter 15, produces a square wave output at the plate of the tube 87. The square wave output is differentiated by the resistor-capacitor network in the grid circuit of the blocking oscillator tube 93, which will be described.

The plate of the tube 87 is connected through the series-connected condensers 89 and 94 to the grid of the tube 93 in the blocking oscillator 17. The resistor 90 is connected to the midpoint connection of the condensers 89 and 94, and to ground. The resistor 95 and the transformer winding 96 are connected in series between the grid of the tube 93 and ground. The bypass condenser 97 is connected across the resistor 95.

The plate of the tube 93 is connected through the transformer winding 98, which is inductively coupled to the winding 96, to the positive terminal of the plate voltage supply source. The cathode of the tube 93 is connected through the series-connected resistors 99 and 100 to ground. The bypass condenser 101 is connected across the resistor 99.

The blocking oscillator 17 is seen to be a conventional, inductively coupled, single swing oscillator which produces a ¼ micro-second pulse across the load resistor 100 in the cathode circuit of the tube 93. This pulse is supplied through the coupling condenser 102 connected to the load resistor 100, and through the wires 103 and 104 to the control grid of the cathode ray tube 11, and produces an intensified spot shown at 27 on the circular trace 25 on the screen of the tube (Fig. 3), for producing the zero range mark. The same pulse is used to trigger the multivibrator 18 as will be described.

The direct current voltage from the conventional range computer 19 of the radar system, which voltage may vary between zero and 25 volts, is applied to the grid of the vacuum tube 107 of the cathode follower 20. The plate of the tube 107 is connected through the resistor 108 to the positive terminal of the plate voltage supply source. Its cathode is connected through the resistors 139 and 140 to ground, and through the coupling condenser 106 to the load resistor 100 of the blocking oscillator 17, and is connected through the resistor 110 to the grid of the vacuum tube 111 of the multivibrator 18.

The plate of the tube 111 is connected through the resistor 112 to the positive terminal of the plate voltage supply source, and is connected through the coupling condenser 113 to the grid of the vacuum tube 114 and to one side of the resistor 115, the other side of which is connected to the positive terminal of the plate voltage supply source.

The grid of the tube 111 is also connected through the coupling condenser 117 to the plate of the vacuum tube 114 which is connected through the resistor 119 to the positive terminal of the plate voltage supply source. The plate of the tube 114 is also connected to one side of the condenser 120, the other side of which is connected through the resistor 121 to the grid of the vacuum tube 122 in the trigger pulse-shaper 21.

The cathodes of the tubes 111 and 114 are connected together and through the bias resistor 124 to ground. The resistor 126 is connected to the resistor 121 at its point of connection to the condenser 120, and to ground.

The plate of the tube 122 is connected through the resistor 127 to the positive terminal of the plate voltage supply source, and is connected through the coupling condenser 128 in the blocking oscillator 22, to the grid of the vacuum tube 129.

The grid of the tube 129 is connected through the resistor 130 to one side of the transformer winding 131, the other side of which is grounded. The bypass condenser 138 is connected across the resistor 130. The plate of the tube 129 is connected through the transformer winding 132, which is inductively coupled to the winding 131, to the positive terminal of the plate voltage supply source.

The cathode of the tube 129 is connected through the series connected resistors 133 and 134 to ground. The bypass condenser 135 is connected across the resistor 133. The midpoint connection of the resistors 133 and 134, is connected through the coupling condenser 136 and the wires 137 and 104 to the control grid of the cathode ray tube 11.

The cathode-follower 20 is used to prevent loading of the circuit of the range computer 19. The output of the computer is a direct-current voltage proportional to the range of the target, and is used to determine the length of delay in the multivibrator 18.

The tube 111 of the multivibrator is normally nonconducting, and its tube 114 is normally conducting as a result of the connection of its grid to the positive terminal of the plate voltage supply source. The zero range, pulse voltage from the load resistor 100 of the blocking oscillator 17, applied through the coupling condenser 106 and the resistor 110 to the grid of the tube 111, biases it positively, causing the tube 111 to conduct, at which time its plate, due to the voltage drop in the resistor 112, swings less positive, causing the grid of the tube 114 to be biased more negatively. This in turn, causes the plate current of the tube 114 to be reduced with a reduced voltage drop through the resistor 119, and a corresponding increased voltage on the plate of the tube 114. A more positive voltage is therefore induced on the grid of the tube 111 causing a further increase in plate current. This process is cumulative so that the plate current of the tube 114 drops almost instantly to zero while that of the tube 111 builds up to its maximum value. The grid of the tube 114 will gradually lose its negative charge, and as soon as the grid potential becomes more positive than the cut-off voltage, plate current will again flow and the tubes will return to their normal operating condition where they will remain until the grid of the tube 111 is again pulsed by the zero range blocking oscillator 17.

The range mark is established when the plate current of the tube 114 returns to normal at which time a voltage pulse is transmitted to the grid of the tube 122 to which the plate of the tube 114 is connected.

The length of delay of the multivibrator is determined by the time constants of the resistor-capacitor network in the grid circuit of the tube 114, and by the voltage to which the grid of the tube 114 must return to cause the tube to conduct. The time constants of the circuits are fixed, but the voltage to which the grid of the tube must return for normal operation, depends upon the voltage on its cathode which in turn, depends upon the voltage from the range computer, which is applied to the grid of the tube 111, and which determines the voltage on the interconnected cathodes of the tubes 111 and 114. The larger the voltage from the range computer, the longer the delay of the multivibrator.

The trigger pulse-shaper 21 consists of a resistor-capacitor differentiator in the grid circuit of the tube 122 which produces sharp voltage peaks at the beginning and end of the voltage pulse appearing at the plate of tube 114. The negative voltage peak occurring at the end of the pulse is inverted and amplified by the tube 122 and supplied to the grid of tube 129 of the blocking oscillator 22.

The blocking-oscillator 22 like the blocking oscillator 17, consists of a conventional inductively coupled, single-swing blocking oscillator, which produces, when energized through the trigger pulse-shaper 21, from the multivibrator, a ¼ microsecond pulse across the load resistor 134 in the cathode circuit of the tube 129, which pulse is applied through the wires 137 and 104 to the control grid of the cathode ray tube 11. This pulse produces the intensified range mark spot shown at 24 on the circular trace on the screen of the cathode ray tube (Fig. 3).

The distance between the zero range mark 27 and the range mark 28 on the circular trace 25 on the screen of the cathode ray tube 11, can be read off the scale formed by the calibrations 26, and indicates the range of the target. Among the advantages of the invention are:

1. It can be used with a conventional radar system without having to be synchronized with any component thereof, although it may be used to perform the additional function of a synchronizer in a pulsed radar system.

2. It can provide an expanded target range scale, the degree of expansion being easily adjusted by changing the divider network into which the direct current voltage from a radar system feeds. The range scale can be adjusted to start at zero range or any other desired range, by adjusting the bias resistor 139 in the cathode circuit of the cathode follower tube 107.

3. The range indication provided on the screen of the cathode ray tube is linear, and the system is stable and accurate.

4. The use of a circular sweep on the screen of a cathode ray tube, provides a long trace on a small diameter tube.

We claim as our invention:

1. Apparatus for indicating the value of a voltage from a direct current source, comprising a cathode ray tube having a screen, means connected to said tube for producing a sweep pattern on said screen, a delay multivibrator, means connected to said tube and to said multivibrator for providing a mark on said pattern and for triggering said multivibrator, means connected to said multivibrator and adapted to be responsive to the voltage from said source for controlling the delay of said multivibrator, and means connected to the multivibrator to be actuated by said multivibrator at the end of said delay for providing a second mark on said pattern, whereby the distance along said pattern between the two marks indicates the value of said voltage.

2. Apparatus for indicating the value of a voltage from a direct current source, comprising a cathode ray tube having a screen and having two sets of deflection plates, means connected to said two sets of deflection plates for establishing a circular sweep pattern on said screen by applying first alternating current voltages to one of said sets of plates and applying second alternating current voltages to the other of said sets of plates, with the second voltages being displaced substantially 90° in phase relative to the first voltages, a delay multivibrator, means connected to said tube for providing a mark on said pattern and connected to the multivibrator for triggering said multivibrator, means adapted to be responsive to the voltage from said source and connected to the multivibrator for controlling the delay of said multivibrator, and means connected to be actuated by said multivibrator at the end of said delay for providing a second mark on said pattern, whereby the distance along said pattern between the two marks indicates the value of said voltage.

3. Apparatus for indicating the value of a voltage from a direct current source, comprising a cathode ray tube having a screen and a control electrode, means connected to said tube for providing a sweep pattern on said screen, a delay multivibrator, means connected to said electrode for applying a voltage pulse to said electrode for providing an intensified spot on said pattern and connected to the multivibrator for triggering said multivibrator, means adapted to be responsive to the voltage from said source and connected to the multivibrator for controlling the delay of said multivibrator, and means connected to be actuated by said multivibrator at the end of said delay for applying another voltage pulse to said electrode for establishing a second intensified spot on said pattern, whereby the distance along said pattern between said spots indicates the value of said voltage.

4. Apparatus for indicating the value of a voltage from a direct current source, comprising a cathode ray tube having a screen, two sets of deflection plates and a control electrode, means connected to said tube for applying alternating current voltages to one of said sets of plates and for applying similar voltages to the other of said sets of plates, with the latter voltages displaced substantially 90° in phase relative to the former voltages for establishing a circular sweep pattern on said screen, a delay multivibrator, means connected to said tube for applying a voltage pulse to said electrode for providing an intensified spot on said pattern and connected to the multivibrator for triggering said multivibrator, means adapted to be responsive to the voltage from said source and connected to the multivibrator for controlling the delay of said multivibrator, and means connected to be actuated by said multivibrator at the end of said delay and connected to said tube for applying another voltage pulse to said electrode for providing a second intensified spot on said pattern, whereby the distance along said pattern between said spots indicates the value of said voltage.

5. Apparatus for indicating the value of a voltage from a direct current source, comprising a cathode ray tube having a screen and having a control electrode, means connected to said tube for establishing a sweep pattern on said screen, a delay multivibrator, means including a blocking oscillator connected to said tube for applying a voltage pulse to said electrode for providing an intensified spot on said pattern and connected to the multivibrator for triggering said multivibrator, means adapted to be responsive to the voltage from said source and connected to control the delay of said multivibrator, and means connected to be actuated by said multivibrator at the end of said delay, with the latter means including a second blocking oscillator and being connected to the tube for supplying a second voltage pulse to said electrode for providing a second intensified spot on said pattern, whereby the distance along said pattern between said spots indicates the value of said voltage.

6. Apparatus for indicating the value of a voltage from a direct current source, comprising a cathode ray tube having a screen, two sets of deflection plates and a control electrode, means connected to said tube for supplying first alternating current voltages to one of said sets of plates and for supplying second alternating current voltages to the other of said sets of plates, but with said first voltages displaced substantially 90° in phase relative to the second voltages, with the latter means thereby establishing a circular sweep pattern on said screen, a delay multivibrator, means connected to said tube and including a blocking oscillator for applying a voltage pulse to said electrode for establishing an intensified spot on said pattern and connected to the multivibrator for triggering said multivibrator, means adapted to be responsive to the voltage from said source and connected to the multivibrator for controlling the delay of said multivibrator, and means connected to be actuated by said multivibrator at the end of said delay, with the latter means including a second blocking oscillator and being connected to said tube for applying a second voltage pulse to said electrode for providing a second intensified spot on said pattern, whereby the distance along said pattern between the two spots indicates the value of said voltage.

7. Apparatus for indicating the value of a voltage from a direct current source, comprising a cathode ray tube having a screen, two sets of deflection plates and a control electrode, an oscillator having an output, means connected to said oscillator and to said tube for supplying a first alternating current voltage from said oscillator to one of said sets of plates and for supplying a second alternating current voltage from said oscillator to the other of said sets of plates, with the first voltage being shifted substantially 90° in phase relative to said second voltage for establishing a circular sweep pattern on said screen, a delay multivibrator, means connected between said tube and the output of said oscillator for supplying a voltage pulse to said electrode for providing an intensified spot on said pattern, with the latter means being connected to the multivibrator for triggering said multivibrator, means adapted to be responsive to the voltage from said source and connected to control the delay of said multivibrator, and means connected between the multivibrator and the tube to be actuated by said multivibrator at the end of said delay for applying a second voltage pulse to said electrode for establishing a second intensified spot on said pattern, whereby the distance along said pattern between said spots indicates the value of said voltage.

8. Apparatus for indicating the value of the voltage from a direct current source, comprising a cathode ray tube having a screen, two sets of deflection plates and a control electrode, an oscillator having an output, means connected between said tube and said oscillator for supplying a first alternating current voltage from said oscillator to one of said sets of plates and for supplying a second alternating current voltage from said oscillator to the other of said sets of plates, with the first voltage being shifted substantially 90° in phase relative to the second voltage for providing a circular sweep pattern on said screen, a delay multivibrator, a blocking oscillator connected to said tube, means connected between the output of said first-mentioned oscillator and said blocking oscillator for applying a voltage pulse to said electrode for providing an intensified spot on said pattern, the latter means being connected to the multivibrator for triggering said multivibrator, means adapted to be responsive to the voltage from said source and connected to the multivibrator for controlling the delay of said multivibrator, a second blocking oscillator connected to said tube, and means connected between the multivibrator and the second blocking oscillator to be actuated by said multivibrator at the end of said delay for applying a second voltage pulse to said electrode for providing a second intensified spot on said pattern, whereby the distance along said pattern between said spots indicates the value of said voltage.

9. Apparatus for indicating the value of the voltage from a direct current source, comprising a cathode ray tube having a screen, two sets of deflection plates and a control electrode, a first oscillator having an output, means connected between said tube and said oscillator for supplying a first alternating current voltage from said oscillator to one of said sets of plates and for supplying a second alternating current voltage from said oscillator to the other of said sets of plates, said second voltage being shifted 90° in phase relative to said first voltage for providing a circular sweep pattern on said screen, a delay multivibrator having an input and an output, a trigger pulse shaper having an output and being connected to the output of said oscillator, a blocking oscillator having an input connected to the output of said trigger pulse shaper and having an output connected to the input of said multivibrator and to said control electrode, said first oscillator being connected to deliver, through said trigger pulse shaper and said blocking oscillator, a voltage pulse to said control electrode for producing an intensified spot on said pattern and to the input of said multivibrator for triggering same, means adapted to be responsive to the voltage from said source and connected to said input of the multivibrator for controlling the delay of said multivibrator, a second trigger pulse shaper having an output and being connected to the output of said multivibrator, a second blocking oscillator connected to the output of said second trigger pulse shaper and having an output connected to said control electrode, said multivibrator being connected to said tube through said second trigger pulse shaper and said second blocking ocillator, such that at the end of said delay the multivibrator supplies a second voltage pulse to said electrode for providing a second intensified spot on said pattern, whereby the distance along said pattern between said spots indicates the value of said voltage.

10. Apparatus for indicating the value of the voltage from a direct current source, comprising a cathode ray tube having a screen, two sets of deflection plates and a control electrode, an oscillator having an output, means connected between said oscillator output and tube for supplying a first alternating current voltage from said oscillator to one of said sets of plates and for supplying a second alternating current voltage from said oscillator, shifted 90° in phase relative to said first voltage, to the other of said sets of plates for thereby providing a circular sweep pattern on said screen, a delay multivibrator having an input and an output, a phase shifter having an output and being connected to the output of said oscillator, a trigger pulse shaper having an output and having an input connected to the output of said phase shifter, a blocking oscillator having an input connected to the output of said trigger pulse shaper and having an output connected to the input of said multivibrator and to said control electrode, with said oscillator being connected through said phase shifter, said trigger pulse shaper and said blocking oscillator to said control electrode for delivering a voltage pulse to said control electrode for producing an intensified spot on said pattern, said oscillator being connected to said multivibrator for triggering same, means adapted to be responsive to the voltage from said source and connected to the multivibrator for controlling the delay of said multivibrator, a second trigger pulse shaper having an output and being connected to the output of said multivibrator, a second blocking oscillator connected to the output of said second trigger pulse shaper and having an output connected to said control electrode, said multivibrator at the end of said delay supplying, through said second trigger pulse shaper and said second blocking oscillator, a second voltage pulse to said electrode for providing a second intensified spot on said pattern, whereby the distance along said pattern between said spots indicates the value of said voltage.

11. In combination in a radar system for determining the distance to a remote object, first means for producing a direct-current potential the magnitude of which depends on the distance to said object, second means for producing a zero distance pulse, said pulse being operative as an initial time reference, third means connected to said first means and to said second means and being responsive to said pulse and operative with said potential producing first means for producing a second pulse at an interval later than said first pulse, the duration of said interval depending on the magnitude of said direct-current potential, and fourth means connected to said second means and to said third means for indicating the duration between said pulses.

12. In combination, in a radar system for determining the distance to a remote target, first means for producing a parameter the magnitude of which depends on the distance to said target, second means for producing a zero distance pulse which is operative as an initial time reference to represent the initial position of zero distance from the target, third means connected to said first means and to said second means and being responsive to said pulse and operative with said parameter producing first means for producing a second pulse at an interval later than said first pulse, the duration of said interval depending on the magnitude of said parameter, and fourth means connected to said second means and to said third means for indicating the duration of said interval between the pulses.

References Cited in the file of this patent

UNITED STATES PATENTS

| Number | Name | Date |
| --- | --- | --- |
| 2,266,401 | Reeves | Dec. 16, 1941 |
| 2,403,278 | Hershberger | July 2, 1946 |
| 2,412,111 | Wilson | Dec. 3, 1946 |
| 2,432,204 | Miller | Dec. 9, 1947 |
| 2,433,667 | Hollingsworth | Dec. 30, 1947 |
| 2,438,904 | De Rosa | Apr. 6, 1948 |
| 2,448,363 | Firestone | Aug. 31, 1948 |
| 2,470,028 | Gordon | May 10, 1949 |
| 2,477,615 | Isbister | Aug. 2, 1949 |